(12) United States Patent
Wang et al.

(10) Patent No.: US 11,199,105 B2
(45) Date of Patent: Dec. 14, 2021

(54) MONITORING SYSTEM FOR A GAS TURBINE ENGINE

(71) Applicant: General Electric Company, Schenectady, NY (US)

(72) Inventors: Guanghua Wang, Clifton Park, NY (US); Daniel Endecott Osgood, Cincinnati, OH (US); William Stewart, Boston, MA (US); Jason Edward Dees, Ballston Lake, NY (US); Eric John Ruggiero, West Chester, OH (US)

(73) Assignee: General Electric Company, Schenectady, NY (US)

( * ) Notice: Subject to any disclaimer, the term of this patent is extended or adjusted under 35 U.S.C. 154(b) by 578 days.

(21) Appl. No.: 15/660,608

(22) Filed: Jul. 26, 2017

(65) Prior Publication Data

US 2019/0032508 A1    Jan. 31, 2019

(51) Int. Cl.
*F01D 21/00* (2006.01)
*G06T 7/00* (2017.01)
*H04N 5/33* (2006.01)

(52) U.S. Cl.
CPC ........... *F01D 21/003* (2013.01); *G06T 7/001* (2013.01); *G06T 7/0004* (2013.01); *H04N 5/332* (2013.01); *F05D 2220/32* (2013.01); *F05D 2240/30* (2013.01); *F05D 2260/607* (2013.01); *F05D 2260/80* (2013.01); *F05D 2270/8041* (2013.01); *G06T 2207/10024* (2013.01); *G06T 2207/10048* (2013.01); *G06T 2207/30164* (2013.01)

(58) Field of Classification Search
CPC ...... F01D 21/003; G01J 5/0088; B64D 45/00; B64D 15/20; F02C 7/057; G01B 21/32
See application file for complete search history.

(56) References Cited

U.S. PATENT DOCUMENTS

| | | |
|---|---|---|
| 4,240,691 A | 12/1980 | Holmqvist et al. |
| 4,306,835 A | 12/1981 | Hurley |
| 4,657,386 A | 4/1987 | Suarez-Gonzalez et al. |
| 4,738,528 A | 4/1988 | Craft |

(Continued)

OTHER PUBLICATIONS

Hayden et al., "Evaluating Lens Purge Systems for Optical Sensors on Turbine Engines," AIAA/ASME/SAE/ASEE 24th Joint Propulsion Conference, Jul. 11-13, 1998, No. AIAA-1988-3037, Boston, MA.

(Continued)

*Primary Examiner* — Neil R Mikeska
(74) *Attorney, Agent, or Firm* — Wood IP LLC (57) ABSTRACT

An optical monitoring system includes a controller configured to determine a predicted status of a component based on an operational time of a rotary machine and an individual model. The controller is also configured to receive a first signal indicative of an infrared spectrum image of the component from one or more cameras. Further, the controller is configured to determine a current status of the component based on the first signal and compare the current status to the predicted status of the component. Additionally, the controller is configured to update the predicted status of the component such that the predicted status matches the current status of the component and update at least one parameter of the individual model of the component based on the comparison.

20 Claims, 5 Drawing Sheets

(56) References Cited

U.S. PATENT DOCUMENTS

| | | | |
|---|---|---|---|
| 4,784,491 | A | 11/1988 | Penney et al. |
| 4,786,188 | A | 11/1988 | Myhre et al. |
| 4,836,689 | A | 6/1989 | O'Brien et al. |
| 4,934,137 | A | 6/1990 | MacKay |
| 5,146,244 | A | 9/1992 | Myhre et al. |
| 5,421,652 | A | 6/1995 | Kast et al. |
| 5,467,815 | A | 11/1995 | Haumann et al. |
| 5,599,105 | A | 2/1997 | Ridley et al. |
| 5,626,462 | A | 5/1997 | Jackson et al. |
| 5,640,767 | A | 6/1997 | Jackson et al. |
| 5,724,816 | A | 3/1998 | Ritter et al. |
| 5,813,836 | A | 9/1998 | Starkweather |
| 5,820,337 | A | 10/1998 | Jackson et al. |
| 5,822,853 | A | 10/1998 | Ritter et al. |
| 6,000,908 | A | 12/1999 | Bunker |
| 6,761,031 | B2 | 7/2004 | Bunker |
| 6,771,296 | B2 | 8/2004 | Hayashi et al. |
| 6,992,315 | B2 | 1/2006 | Twerdochlib |
| 7,091,470 | B2 | 8/2006 | Horikawa et al. |
| 7,231,817 | B2 | 6/2007 | Smed et al. |
| 7,432,505 | B2 * | 10/2008 | Brummel .............. F01D 21/003 250/332 |
| 7,501,630 | B2 | 3/2009 | Russell |
| 7,619,728 | B2 | 11/2009 | Ogburn et al. |
| 8,063,372 | B2 * | 11/2011 | Lemieux .............. G01D 18/008 250/339.04 |
| 8,413,493 | B1 * | 4/2013 | Polywoda, III ....... G01M 15/14 73/112.01 |
| 9,057,710 | B2 * | 6/2015 | Hatcher .............. G02B 23/2476 |
| 9,134,199 | B2 * | 9/2015 | Hwang ................. G01M 15/14 |
| 9,305,345 | B2 * | 4/2016 | Lim ...................... G06T 7/0004 |
| 9,335,216 | B2 * | 5/2016 | Wang .................... G01J 5/0088 |
| 9,400,217 | B2 * | 7/2016 | Baleine ................ G01J 5/0088 |
| 9,470,147 | B2 * | 10/2016 | Lemieux ................ F02C 7/00 |
| 9,670,793 | B2 * | 6/2017 | Zombo ................ F01D 21/003 |
| 9,706,140 | B2 * | 7/2017 | Haldeman ................ H04N 5/33 |
| 9,706,152 | B2 * | 7/2017 | Griffith ................. G01N 25/72 |
| 9,708,927 | B2 * | 7/2017 | Hatcher, Jr. ........... F01D 21/003 |
| 9,709,463 | B2 * | 7/2017 | DeAscanis ............ G01M 15/14 |
| 9,776,731 | B1 * | 10/2017 | Lieberman ............. B64D 45/00 |
| 9,778,141 | B2 * | 10/2017 | Bancalari .............. F01D 21/003 |
| 9,832,396 | B2 * | 11/2017 | Haldeman ................ H04N 5/33 |
| 10,060,830 | B2 * | 8/2018 | Utay ..................... G01M 15/14 |
| 2004/0101023 | A1 | 5/2004 | Choi |
| 2005/0199832 | A1 | 9/2005 | Twerdochlib |
| 2007/0125090 | A1 | 6/2007 | Martis et al. |
| 2008/0101683 | A1 | 5/2008 | Zombo et al. |
| 2009/0175525 | A1 | 7/2009 | Farrer et al. |
| 2010/0220182 | A1 | 9/2010 | Krull |
| 2011/0239657 | A1 | 10/2011 | Tate |
| 2011/0267428 | A1 * | 11/2011 | George .............. G01N 21/9515 348/46 |
| 2013/0091855 | A1 | 4/2013 | Race |
| 2014/0063227 | A1 * | 3/2014 | Baleine .............. G02B 23/2492 348/82 |
| 2014/0267693 | A1 | 9/2014 | Newman |
| 2016/0017866 | A1 | 1/2016 | Craft et al. |
| 2016/0160762 | A1 | 6/2016 | Chandra et al. |
| 2016/0245187 | A1 | 8/2016 | Prociw |

OTHER PUBLICATIONS

Lucia et al., "An Infrared Pyrometry System for Monitoring Gas Turbine Blades: Development of a Computer Model and Experimental Results," J. Eng. Gas Turb Power, 1994, pp. 173-177, vol. 116.

Kerr et al., "A Review of Purge Air Designs for Aeroengine-Based Optial Pyrometers," J. Turbomach, 2002, pp. 227-234, vol. 124, No. 2.

Kerr et al., "Particle Deposition on Optical Pyrometer Lenses: An Illustrative Case Study," J. Aerosol Sci., 2002, pp. 1577-1588, vol. 33, No. 11.

Kerr et al., "Computational Comparison of the RB199 and GE90 Pyrometer Purging Systems," International Gas Turbine Institute, 2002, pp. 261-269, vol. 2A.

Kerr et al., "Optical Fouling of the RB199 Pyrometer," J. Propul. Power, 2003, pp. 66-72, vol. 19, No. 1.

Kerr et al., "An Evaluation of Air-Purging Configurations for Optical Pyrometers in Gas Turbines," Aerosol Sci. Tech., 2004, pp. 91-99, vol. 38, No. 2.

Kerr et al., "Exploratory Design Modifications For Enhancing Pyrometer Purge Air System Performance," Int. J. Turbo Jet Eng., 2004, pp. 203-210, vol. 21, No. 3.

Kerr et al., "Particle Deposition in the GE90 Pyrometer Purge Air System," Particul. Sci. Technol., 2004, pp. 51-64, vol. 22, No. 1.

Bagavathiappan, S., et al.; "Infrared Thermographs for Condition Monitoring—A Review", Infrared Physics & Technology, https://www.researchgate.net/publication/236236241_Infrared_Thermography_for_Condition_Monitoring-_A_Review, vol. 60, pp. 35-55, Jan. 2, 2013.

"Wind Turbine Blade Interactive Inspection Method", IP.com Prior Art Database, https://priorart.ip.com/IPCOM/000230789, Sep. 12, 2013.

Oh, Ki-Yong, et al.; "Blade Health Monitoring and Diagnosis Method to Enhance Operational Safety of Wind Turbine", Conference on Precision Electromagnetic Measurements (CPEM), Aug. 24-29, 2014.

Oh, Ki-Yong, et al.; "A Novel Method and its Field Tests for Monitoring and Diagnosing Blade Health for Wind Turbines", IEEE Transactions on Instrumentation and Measurement, vol. 64, Issue 6, pp. 1726-1733, Jun. 2015.

International Search Report and Written Opinion issued in connection with corresponding PCT Application No. PCT/US18/40204 dated Nov. 26, 2018.

* cited by examiner

MONITORING SYSTEM FOR A GAS TURBINE ENGINE

BACKGROUND

The subject matter disclosed herein relates to a monitoring system for a gas turbine engine.

Certain gas turbine engines include a turbine having viewport(s) configured to facilitate monitoring of various components, such as blades, within the turbine. For example, a monitoring system may capture images of the blades through the viewport(s) to monitor statuses of the blades. The monitoring system may collect the images in wavelengths of light that correspond to visible images, such that current statuses of the blades may be determined. However, because certain monitoring systems only capture visible images, statuses determined based on limited information may be less accurate. Relying on such statuses may result in inefficient scheduling of repair and/or replacement of the blades.

BRIEF DESCRIPTION

In one embodiment, an optical monitoring system includes a controller configured to determine a predicted status of a component within an interior of a rotary machine based at least in part on an operational time of the rotary machine and an individual model of the component. The controller is also configured to receive a first signal indicative of an infrared spectrum image of the component from one or more cameras. The controller is further configured to determine a current status of the component based at least in part on the first signal and compare the current status to the predicted status of the component. Additionally, the controller is configured to update the predicted status of the component such that the predicted status matches the current status of the component and update at least one parameter of the individual model of the component based at least in part on the comparison.

In another embodiment, an optical monitoring system configured to optically communicate with an interior of a rotary machine includes one or more cameras configured to receive an infrared spectrum image of a component within the interior of the rotary machine. The one or more cameras are configured to output a first signal indicative of the infrared spectrum image. The optical monitoring system also includes a controller communicatively coupled to the one or more cameras and configured to determine a predicted status of the component based at least in part on an operational time of the rotary machine and an individual model of the component. Additionally, the controller is configured to receive the first signal output from the one or more cameras. Further, the controller is configured to determine a current status of the component based at least in part on the first signal and compare the current status to the predicted status of the component. Moreover, the controller is configured to update the predicted status of the component such that the predicted status matches the current status of the component and update at least one parameter of the individual model of the component based at least in part on the comparison.

In a further embodiment, a method includes determining, via a controller, a predicted status of a component within an interior of a rotary machine based at least in part on an operational time of the rotary machine and an individual model of the component. The method also includes receiving, via the controller, a first signal indicative of an infrared spectrum image of the component from one or more cameras. Additionally, the method includes determining, via the controller, a current status of the component based at least in part on the first signal and comparing, via the controller, the current status to the predicted status of the component. Further, the method includes updating, via the controller, the predicted status of the component such that the predicted status matches the current status of the component. Moreover, the method includes updating, via the controller, at least one parameter of the individual model of the component based at least in part on the comparison.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Embodiments disclosed herein may enhance gas turbine engine operation and maintenance by collecting and analyzing visual spectrum image(s) and infrared (IR) spectrum image(s) of gas turbine engine components. In certain embodiments, a system for optically monitoring a gas turbine engine includes a viewport within a casing of the gas turbine engine (e.g., a turbine casing, etc.). The system also includes an optical connection positioned outside the casing and optically coupled to the viewport. The optical connection is configured to convey an image from an interior of the casing to a camera unit. The camera unit may include one or more cameras to capture both visual and IR spectrum image(s) from the interior of the casing. The one or more cameras may be included within a common housing to reduce a size of the camera unit. Additionally, the camera unit may output signals indicative of the visual and IR spectrum image(s).

In some embodiments, the visual and IR spectrum image(s) are output to a controller that determines statuses of the gas turbine engine components, such as one or more blades, based at least in part on the visual and IR spectrum image(s). For example, the controller may determine a predicted blade status of a blade of the gas turbine engine based at least in part in an individual model of the blade and an operational time of the gas turbine engine. Based on the visual and IR spectrum image(s), the controller may also determine a current status of the blade. The controller then compares the current blade status to the predicted blade status. The controller also provides the current blade status as a boundary condition to the individual model. Based on the comparison, the controller also updates parameters of the individual model such that the predicted blade status matches the current blade status. Accordingly, monitoring of the predicted blade status provides more accurate determinations of when the blade has reached its service limit.

Figure 1:
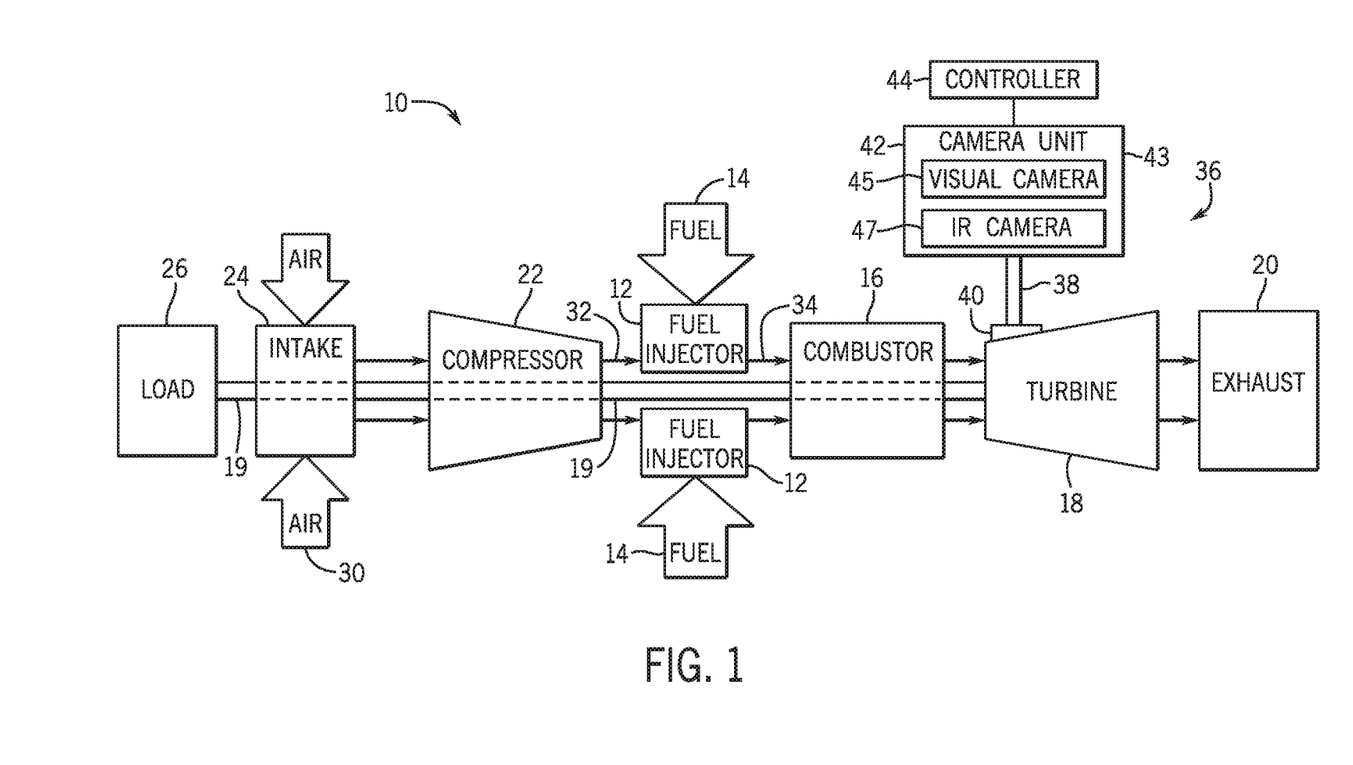
FIG. 1 is a block diagram of an embodiment of a gas turbine system including an optical monitoring system for monitoring turbine components of the gas turbine system.

Turning now to the drawings, FIG. 1 is a block diagram of an embodiment of a gas turbine system 10 (e.g., rotary machine), including an optical monitoring system for monitoring turbine components of the gas turbine system 10. The gas turbine system 10 includes a fuel injector 12, a fuel supply 14, and a combustor 16. As illustrated, the fuel supply 14 routes a liquid fuel and/or gas fuel, such as natural gas, to the combustor 16 through the fuel injector 12. As discussed below, the fuel injector 12 injects and mixes the fuel with compressed air. The combustor 16 ignites and combusts the fuel-air mixture, and then passes hot pressurized exhaust gas into a turbine 18. The turbine 18 includes one or more stators having fixed vanes or blades, and one or more rotors having blades that rotate relative to the stator(s). The exhaust gas passes through the turbine rotor blades, thereby driving the turbine rotor(s) to rotate. Coupling between the turbine rotor(s) and a shaft 19 induces rotation of the shaft 19, which is also coupled to several components throughout the gas turbine system 10, as illustrated. Eventually, the exhaust of the combustion process exits the gas turbine system 10 as an exhaust gas 20.

A compressor 22 includes blades rigidly mounted to a rotor, which is driven to rotate by the shaft 19. As air passes through the rotating blades, air pressure increases, thereby providing the combustor 16 with sufficient air for proper combustion. The compressor 22 intakes air to the gas turbine system 10 via an air intake 24. Further, the shaft 19 may be coupled to a load 26, which is powered via rotation of the shaft 19. The load 26 may be any suitable device that may use the power of the rotational output of the gas turbine system 10, such as a power generator or an external mechanical load. For example, the load 26 may include an electrical generator, a propeller of an airplane or aircraft, and so forth. The air intake 24 draws air 30 into the gas turbine system 10 via a suitable mechanism, such as a cold air intake. The air 30 then flows through blades of the compressor 22, which provides compressed air 32 to the combustor 16. In particular, the fuel injector 12 may inject the compressed air 32 and fuel 14, as a fuel-air mixture 34, into the combustor 16. Alternatively, the compressed air 32 and fuel 14 may be injected directly into the combustor for mixing and combustion.

As illustrated, the gas turbine system 10 includes an optical monitoring system 36 optically coupled to the turbine 18. In the illustrated embodiment, the optical monitoring system 36 includes one or more optical connections 38 (e.g., optical relays, fiber optic cable(s), optical waveguide(s), etc.) extending between a camera unit 42 and a viewport 40 into the turbine 18. The optical connection 38 may be disposed within a substantially rigid tube. The viewport 40 is disposed within an opening in a casing of the turbine 18. The opening extends from an interior side of the casing to an exterior side of the casing. The optical connection 38 is positioned outside the casing and is optically coupled to the viewport 40. The optical connection 38 is configured to receive an image of a component within the turbine 18 through the viewport 40, and provide the image to the camera unit 42. In some embodiments, the component is a blade of the turbine, a rotor having multiple blades, the environment surrounding the blades and the rotor, or a combination thereof. However, the component will be discussed as a blade of the turbine (e.g., turbine blade) for the ease of discussion. The camera unit 42 collects visual image(s) (e.g., visual spectrum image(s)) and infrared (IR) image(s) (e.g., IR spectrum image(s)) of the blade (e.g., component) within the turbine 18. The camera unit 42 includes one or more cameras that acquire the visual image(s) and IR image(s) of the blade within the turbine 18. In some embodiments, the camera unit 42 includes one or more cameras each configured to capture both the visual image(s) and the IR image(s). Further, the camera unit 42 may include at least one visual camera 45 to capture visual image(s) and at least one IR camera 47 to capture IR image(s). For example, the camera unit 42 may include one visual camera 45 and one IR camera 47, one visual camera 45 and more than one IR camera 47, more than one visual camera 45 and one IR camera 47, or more than one visual camera 45 and more than one IR camera 47. In some embodiments, the visual camera 45 and the IR camera 47 are within a shared housing 43 structurally coupled to the optical connection 38. Additionally, the visual camera 45 and/or the IR camera 47 may be micro cameras, that is, cameras that are very small, so that the cameras 45, 47 may be easily maneuvered to capture the visual and IR image(s). In some embodiments, the visual camera 45 and the IR camera 47 may be combined together and/or combined in different combinations than the manners discussed above.

The camera unit 42 is configured to capture the visual and IR image(s) of the blade inside the casing of the turbine 18, and output signals indicative of the visual and IR image(s). For example, the visual camera 45 of the camera unit 42 may output signal(s) indicative of the visual image(s) (e.g., second signal(s)), and the IR camera 47 may output signal(s) indicative of the IR image(s) (e.g., first signal(s)). In some embodiments, the camera unit 42 may not include the visual camera 45, such that only IR image(s) are employed to perform the techniques discussed herein. Further, the signals from the camera unit 42 may only be collected if the signals are indicative of images having wavelengths within a desired wavelength range. The desired wavelength range may different for the visual camera 45 and the IR camera 47 of the camera unit 42. That is, the camera unit 42 may filter undesired noise or ranges of wavelengths by utilizing absorptive filters, dichroic filters, or another suitable type of optical filter for producing images having wavelengths within the desired wavelength ranges for each camera 45, 47 of the camera unit 42. The optical monitoring system 36 then determines a current blade status (e.g. current status, current component status) based on the visual and IR image(s) from the camera unit 42. In embodiments in which the camera unit 42 does not include the visual camera, the optical monitoring system 36 may determine the current blade status based on the IR image(s) from the IR camera 47.

In the illustrated embodiment, a controller 44 is communicatively coupled to the camera unit 42. The controller 44 is configured to receive the signals indicative of the visual and IR image(s). The controller 44 then determines the current blade status based on the signals indicative of the visual and IR image(s). Because the optical monitoring system 36 may utilize both visual and IR image(s) to determine the current status of each blade, the optical monitoring system 36 collects more information about the blade than monitoring systems that employ only visual image(s) of the blade. For example, the current blade status may define various states of the blade. The states of the blade included in the current blade status may include current states of an amount of spallation of a thermal barrier coating of the blade, a number of blocked cooling holes within the blade, an amount of debris on the blade, an amount of oxidation of the blade, an amount of corrosion of the blade, or a combination thereof. The current blade status may also include other information associated with the blade, such as a structural integrity of the blade and/or a status of a crack within the blade. In embodiments in which a component other than the blade is monitored, other current statuses may be respectively determined. For example, other components, such as liners, having an environmental barrier coating may have current component statuses indicative of an amount of spallation of the environmental barrier coating.

The current blade status may be defined in terms of units associated with each state of the current blade status. For example, the current blade status may be a linear array of each state of the blade, each element having units respective to each state. That is, the current blade status may specify that the thermal barrier coating of the blade is 5 mm thick, that 10 cooling holes within the blade are blocked, and that 2 mm of debris has accumulated on the blade. In some embodiments, the current blade status is represented as a percentage of a respective service limit for each state of the current blade status. For example, the service limit for the thermal barrier coating may be reached when the thermal barrier coating is 0 mm thick. Then, if the current blade status indicates that spallation has reduced the thickness of the thermal barrier coating from 10 mm to 4 mm, the current blade status of the state of the thermal barrier coating may be 60 percent. Additionally, if the service limit for a crack is reached when a crack is 10 mm and the blade includes a 3 mm crack, the current blade status of the state of the crack may be 30 percent. In some embodiments, the current blade status may be defined as the percentage of the state of the blade having the highest percentage relative to the respective service limit. That is, if the state of the thermal barrier coating of the current blade status is 60 percent and the state of crack of the current blade status is 30 percent, the current blade status is 60%. In certain embodiments, the percentage of the current blade status is the highest state percentage because the highest state percentage may reach the respective service limit for that state before the other states of the current blade status.

The controller 44 receives or generates an individual model for each blade. The controller 44 then uses the individual model for each blade to determine a predicted blade status (e.g., predicted status, predicted component status) of each blade. The controller 44 may input the current blade status, the signals indicative of the visual and IR image(s) of the blade or other data that describes the blade to the individual model. In some embodiments, the individual model utilizes parameters associated with the environment surrounding the blades and/or expected rate(s) of wear on the blade. For example, the parameters of the individual model may include a shape of the blade, an expected operating temperature of the turbine section in which the blade is located, an expected operating pressure of the turbine section in which the blade is located, an expected rate of spallation of a thermal barrier coating on the blade at the expected operating temperature and/or operating pressure, an expected rate of debris buildup on the blade, an expected rate of blockage of cooling holes within the blade (e.g., based on the expected rate of debris buildup), a rate of spallation of an environmental barrier coating of the blade or other component, a rate of debris buildup on the blade, a rate of oxidation of the blade or other component, a rate of corrosion of the blade or other component, among other suitable parameters, or a combination thereof. One or more of the parameters may be determined based at least in part on the value of another parameter. For example, the expected rate of blockage of cooling holes may be based at least in part on the expected rate of debris buildup.

In some embodiments, the controller 44 determines the predicted blade status based on the individual model of the blade and an operational time of the turbine 18. That is, using the individual model, the controller 44 determines (e.g., predicts) values of the various states of the predicted blade status at a determined time. For example, the predicted blade status may define the same or similar states of the blade as the current blade status. That is, the states of the blade included in the predicted blade status may include predicted states of an amount of spallation of a thermal barrier coating of the blade, a number of blocked cooling holes within the blade, an amount of debris on the blade, or a combination thereof. The predicted blade status may also include other information associated with the blade, such as a structural integrity of the blade and/or a status of a crack within the blade.

In some embodiments, controller 44 stores a turbine cycle count. The turbine cycle count may describe an operational time of the turbine 18 or gas turbine system 10. The turbine cycle count is a count of how many times the turbine 18 has been activated and then deactivated. In embodiments in which the gas turbine system 10 is located within an aircraft, the turbine cycle count may correspond to a number of flight cycles of the aircraft. Based on the individual model for each blade, the controller 44 may determine the predicted blade status of each blade based for a later turbine cycle count. Indeed, the predicted status may be determined for any turbine cycle count. The predicted blade status may also be determined based on a total run time of the turbine 18, or another operational time of the turbine 18.

The controller 44 may utilize the current blade status and the predicted blade status to facilitate short-term and/or long-term health monitoring of the blade and the turbine 18. For example, after using the individual model to determine the predicted blade status of the same operational time as the current blade status, the controller 44 compares the predicted blade status to the current blade status. Then, the controller 44 may update parameter(s) of the individual model to generate a new predicted blade status that is within a threshold of the current blade status. That is, the controller 44 determines the predicted blade status from the operational time of a previous determined current blade status to the operational time of the current blade status. Moreover, the controller 44 also provides the current blade status as a boundary condition for the individual model. In this manner, the predicted blade statuses are continually based on the most recently determined current blade status.

Further, while the present embodiments are directed to monitoring the blades of the turbine 18, it is to be understood that the visual and IR monitoring techniques disclosed herein may be applied in other areas. For example, an optical monitoring system having visual and IR functionality may be applied to other components of the turbine 18, such as liners, shrouds, and/or nozzles. An optical monitoring system having visual and IR functionality may also be applied to other components of the gas turbine system 10, such as the combustor 16 and/or the compressor 22.

Figure 2:
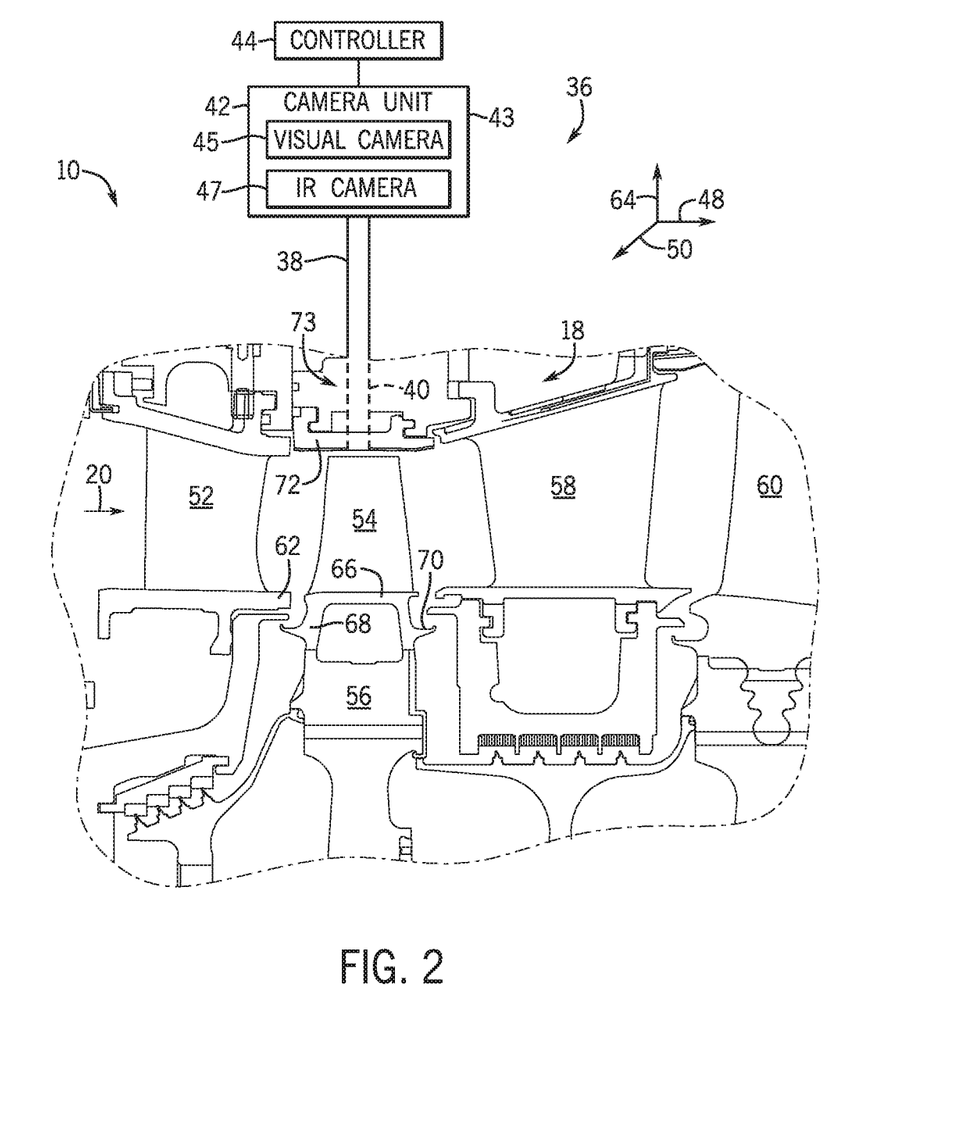
FIG. 2 is a cross-sectional view of an embodiment of a turbine section, including various turbine components that may be monitored by the optical monitoring system of FIG. 1.

FIG. 2 is a cross-sectional view of an embodiment of a turbine section, including various turbine components such as blades that may be monitored by the optical monitoring system 36. As illustrated, exhaust gas 20 from the combustor flows into the turbine 18 in an axial direction 48 and/or a circumferential direction 50. The illustrated turbine 18 includes at least two stages, with the first two stages shown in FIG. 2. Other turbine configurations may include more or fewer turbine stages. For example, a turbine may include 1, 2, 3, 4, 5, 6, or more turbine stages. The first turbine stage includes vanes 52 and blades 54 substantially equally spaced in the circumferential direction 50 about the turbine 18. The first stage vanes 52 are rigidly mounted to the turbine housing and are configured to direct the exhaust gas 20 toward the blades 54. The first stage blades 54 are mounted to a rotor 56 that is driven to rotate by the exhaust gas 20 flowing through the blades 54. The rotor 56, in turn, is coupled to the shaft, which drives the compressor and the load. The exhaust gas 20 then flows through second stage vanes 58 and second stage blades 60. The second stage blades 60 are also coupled to the rotor 56. As the exhaust gas 20 flows through each stage, energy from the gas is converted into rotational energy of the rotor 56. After passing through each turbine stage, the exhaust gas 20 exits the turbine 18 in the axial direction 48.

In the illustrated embodiment, each first stage vane 52 extends outwardly from an endwall 62 in a radial direction 64. The endwall 62 is configured to block hot exhaust gas 20 from engaging the rotor 56. A similar endwall may be present adjacent to the second stage vanes 58, and subsequent downstream vanes, if present. Similarly, each first stage blade 54 extends outwardly from a platform 66 in the radial direction 64. The platform 66 is part of a shank 68 which couples the blade 54 to the rotor 56. The shank 68 also includes a seal, or angel wing, 70 configured to block hot exhaust gas 20 from engaging the rotor 56. Similar platforms and angel wings may be present adjacent to the second stage blades 60, and subsequent downstream blades, if present. Furthermore, a shroud 72 is positioned radially outward from the first stage blades 54. The shroud 72 is configured to reduce the quantity of exhaust gas 20 that bypasses the blades 54. Gas bypass is undesirable because energy from the bypassing gas is not captured by the blades 54 and translated into rotational energy. While the optical monitoring system 36 is described below with reference to monitoring individual blades 54 within the turbine 18 of a gas turbine system, it should be appreciated that the optical monitoring system 36 may be employed to monitor components within other rotating and/or reciprocating machinery, such as a turbine in which steam or another working fluid passes through blades of the turbine to produce a rotational output. Moreover, the components monitoring by the optical monitoring system 36 may include other components within a path of hot gas within a gas turbine system. For example, respective current statuses and predicted statuses may be determined for the shroud 72, the angel wings 70, the shanks 68, or the like. Additionally, the components may include suitable elements within compressors or combustors of the gas turbine system.

In the illustrated embodiment, the optical connection 38 optically couples the viewport 40 to the camera unit 42. As illustrated, the optical connection 38 is configured to convey image(s) of the blade 54, or the blade 54 and the environment surrounding the blade, to the camera unit 42. The viewport 40 may be angled in the axial direction 48, circumferential direction 50, and/or radial direction 64 to direct the viewport 40 toward a desired region of the blade 54 or a desired region of the interior of the turbine 18. In addition, the viewport 40 may be positioned upstream of the blade 54 to facilitate monitoring an upstream portion of the blade 54, or downstream from the blade 54 to facilitate monitoring a downstream portion of the blade 54. In some embodiments, multiple viewports 40 are disposed in multiple locations of the gas turbine system 10. The multiple viewports 40 may each have a respective optical connection 38 to communicatively couple to the camera unit 42.

In the illustrated embodiment, the viewport 40 is disposed within an opening in a casing 73, and in certain embodiments, in the shroud 72 of the turbine 18. The opening extends from an interior side of the casing 73 to an exterior side of the casing, and the viewport is configured to receive image(s) from inside the casing 73. The optical connection 38 is positioned outside the casing 73 and is optically coupled to the viewport 40. The optical connection 38 is configured to convey the image(s) from the viewport 40 to the camera unit 42. The optical connection 38 may be substantially straight, as illustrated, or the optical connection 38 may include curves that establish clearance between the optical connection 38 and other components positioned outside the turbine casing 73.

While the viewport 40 is directed toward the first stage blades 54 in the illustrated embodiment, it should be appreciated that the viewport 40 may be directed toward other turbine components in alternative embodiments. For example, one or more viewports 40 may be directed toward the first stage vanes 52, the second stage vanes 58, the second stage blades 60, the endwalls 62, the platforms 66, the angel wings 70, the shrouds 72, other components within the turbine 18, or a combination thereof. Further embodiments may include viewports 40 directed toward multiple components within the turbine 18. The optical monitoring system 36 may collect the IR image(s) for each blade within a field of view of a viewport 40. In some embodiments, the optical monitoring system also collects the visual image(s) for each blade within the field of view of the viewport 40. In this manner, the controller 44 may determine the current blade status, determine the predicted blade status, compare the current blade status to the predicted blade status, update the predicted status to match the current status, and update parameters of the individual model based on the comparison of, thereby providing input to the optical monitoring system 36, as discussed below.

The camera unit 42 receives the image(s) from the optical connection 38 and outputs signals indicative of visual and thermal image(s) within respective wavelength ranges. The camera unit 42 may capture multiple image(s) over a period of time. As will be appreciated, certain blades, such as the first stage blades 54 described above, may rotate at high speed along the circumferential direction 50 of the turbine 18. Consequently, to capture an image of such blades 54, the camera unit 42 may operate at a frequency sufficient to provide the controller 44 with a substantially still image of each blade 54. For example, in certain embodiments, the camera unit 42 may output the signals indicative of the visual and IR image(s) at a frequency greater than approximately 100, 1000, 10,000, 20,000, 40,000, 60,000, 80,000, or 100,000 Hz, or more. In certain embodiments, the camera unit 42 may output the signals indicative of the visual and IR image(s) with an integration time shorter than approximately 25, 20, 15, 10, 5, 3, 2, 1, or 0.5 microseconds, or less.

The camera unit 42 may include one or more visual cameras 45 and one or more IR cameras 47 to collect and transmit the signals indicative of the visual and IR image(s). The controller 44 may then receive the visual and IR image(s) from the visual camera 45 and the IR camera 47 to perform the techniques discussed herein. Certain embodiments may also employ the visual camera 45 and the IR camera 47 on the same optical connection 38 and/or within a shared housing. The camera unit 42 may only include IR cameras 47 suitable for collecting IR image(s). Additionally, the camera unit 42 may include more than one visual camera 45, more than one IR camera 47, one or more combined camera that detects both visual and IR image(s), or a combination thereof.

Various components within the turbine 18 (e.g., vanes 52 and 58, blades 54 and 60, endwalls 62, platforms 66, angel wings 70, shrouds 72, etc.) are exposed to the hot exhaust gas 20 from the combustor. Consequently, it may be desirable to monitor a current blade status of one or more of the blades 54, 56 during operation of the turbine 18. The current blade status may define various states of the blade. The states of the blade included in the current blade status may include current states of an amount of spallation of a thermal barrier coating of the blade, a number of blocked cooling holes within the blade, an amount of debris on the blade, an amount of oxidation of the blade, an amount of corrosion of the blade, a structural integrity of the blade, a status of a crack within the blade, or a combination thereof.

The controller 44 of the optical monitoring system 36 may collect and store visual and IR image(s) of the first stage blades 54 of the turbine to determine and monitor the current blade status of each blade 54. Thus, the current blade status may be used to identify and monitor one or more of the blade 54 having one or more states closest to their respective service limits. The optical monitoring system 36 generates or receives the individual model for each blade 54. The controller 44 additionally utilizes the individual model to determine the predicted blade status of the same operational time as the current blade status. The controller 44 may then compare the predicted blade status to the current blade status and update parameter(s) of the individual model. Further, the controller 44 provides the current blade status as a boundary condition for the individual model.

By utilizing both visual and IR image(s) of the blade 54 to update individual models of the blades 54, the optical monitoring system 36 determines a more accurate predicted blade status of the blade 54 compared to monitoring systems that only rely on visual image(s). Then, the controller 44 may perform a control action if the current blade status reaches a threshold status corresponding to a service limit of the blade, the predicted status of the blade reaches the threshold status, or any combination thereof. In embodiments having one or more blades, the controller 44 may perform the control action based on the blade having a current blade status and/or predicted blade status closest to the service limit of the blade.

The optical monitoring system 36 determines the current blade status of the blade 54 at several points during the operating lifetime of the blade 54. For example, an initial status determination of the blades 54 may be performed before the gas turbine system 10 is employed to operate an aircraft. The initial status determination may be performed when the gas turbine system 10 is first received by an operator, or when the gas turbine system 10 is on a test stand. The initial status determination of the blades 54 may be used as a benchmark for future status determinations. Further, the initial status determination may be utilized by the controller 44 to identify the individual blades 54. The controller 44 may analyze the visual and IR image(s) to identify marks, codes, bar codes, engine serial numbers, or other features of the individual blades 54. Then, the controller 44 may map the identified features to certain blades of the individual blades 54. In certain embodiments, the controller 44 identifies the individual blades 54 based on a pattern matching algorithm. By way of an example, if a unique visual feature is identified on a blade 54, the unique visual feature may be associated with the blade 54. Further, the unique visual feature may be used for subsequent identification of that particular blade 54. In this way, the current blade status may be compared to the predicted blade of each identified blade 54. In some embodiments, the recognition of individual blades is performed via a marker disposed between or adjacent the rotating blades 54. The camera unit 42 may therefore capture image(s) of the marker and the blades 54. Based on a speed of rotation of the rotor 56 and a known circumferential distance between the blades 54, the controller 44 may then identify the individual blades 54.

In some embodiments, the initial status determination is performed when the gas turbine system 10 is operating at steady state. Steady state may be achieved when the blades 54 have warmed to a steady state temperature and/or when the temperature of the blades 54 does not change with continued operation of the gas turbine system 10. In some embodiments, the temperatures of the blades 54 are determined by the controller based on the visual and/or IR image(s) of the blades 54. Operation of the gas turbine system 10 heats the blade 54, creating a temperature profile therethrough. Thus, the IR camera 47 captures image(s) indicative of the temperature profile of the blade 54, which the controller 44 may employ to determine the current blade status. Accordingly, the IR image(s) have an increased usefulness when taken at the steady state temperature because the temperature profile of the blade 54 is indicative of an operational temperature profile of the blade 54.

Further, the visual image(s) of the blades 54 may be captured by hand cracking of the turbine 18 (e.g., when the turbine 18 is not in operation) because the visual image(s) may be captured at a temperature of the ambient environment. In embodiments in which the visual cameras and the IR cameras receive image(s) from a common optical connection 38, the visual image(s) may be captured at approximately the same time as the IR image(s) (e.g., during the same turbine cycle). In some embodiments, the camera unit 42 does not include the visual camera 45, and the optical monitoring system 36 determines the current and predicted statuses of the blades based on the IR image(s).

The controller 44 may perform subsequent status determinations after the gas turbine system 10 has operated for a duration of time. For example, the controller 44 may receive the visual and IR image(s) after a number of turbine cycles have passed, then use the visual and IR image(s) to determine a current blade status. The controller 44 also determines the predicted blade status of the same operational time as the current blade status. That is, during subsequent status determinations, the controller 44 may determine the current blade status of the blade 54, the predicted blade status of the blade 54, or a combination thereof. The controller 44 may perform a control action if the current blade status reaches a threshold status corresponding to a service limit of the blade, the predicted status of the blade reaches the threshold status, or any combination thereof. In this manner, the controller 44 may accurately monitor the blade 54 to determine when the current blade status, the predicted blade status, and/or various states of the current blade status and the predicted blade status reach respective service limits.

Figure 3:
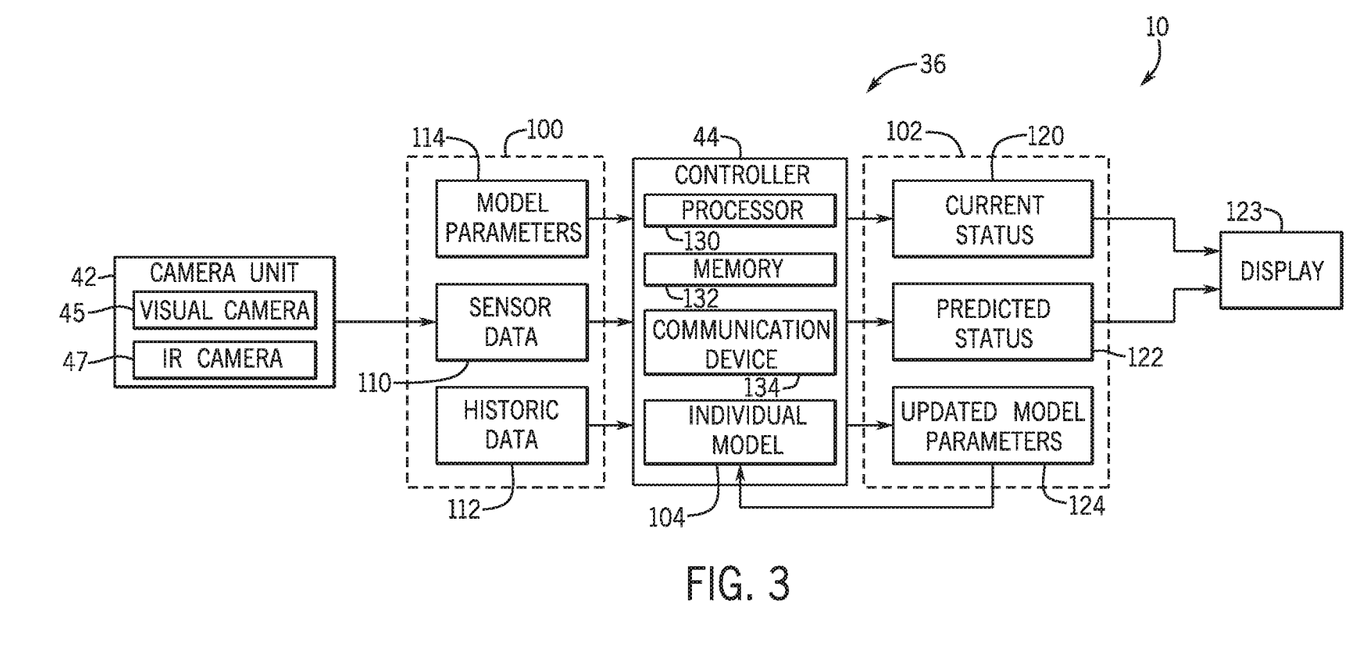
FIG. 3 is a block diagram of an embodiment of the optical monitoring system for that may be used to monitor turbine components of the gas turbine system of FIG. 1.

FIG. 3 is a block diagram of an embodiment of the optical monitoring system 36 that may be used to monitor turbine components of the gas turbine system 10. As illustrated, the controller 44 receives inputs 100 and generates outputs 102 using an individual model 104 for each turbine blade.

In some embodiments, the controller 44 determines the predicted blade status and/or the current blade status based on the inputs 100 to the controller 44. For example, the controller 44 may receive sensor data 110 from the camera unit 42, from sensors disposed within the gas turbine system 10, from control elements of the gas turbine system 10, or a combination thereof. For example, the visual camera 45 and the IR camera 47 may transmit signals indicative of visual and IR images respectively. Then, the camera unit 42 outputs the signals indicative of visual and IR image(s) to the controller 44 as an input 100. In some embodiments, the signals from the camera unit 42 may be transmitted during steady state operation of the gas turbine system 10, such as when the gas turbine system 10 is operating at idle thrust. The sensor data 110 may also include flight information (e.g., full authority digital engine control (FADEC) information). Further, the inputs 100 may include historic data 112 of the gas turbine system 10. In some embodiments, the historic data 112 is data that was previously received by the controller 44 as sensor data 110 and stored in a memory device.

In the illustrated embodiment, the inputs 100 provided to the controller 44 include model parameters 114 for the individual models 104. In some embodiments, the model parameters 114 are initially determined based on the initial status determination of the blades of the turbine and/or based on general model parameters 114 (e.g., parameters determined on a test bench for a specific type of blade). The controller 44 utilizes the individual models 104 and the initial status determination of the blades as boundary conditions to determine predicted blade statuses at later operational times of the gas turbine system 10. For example, if the controller determines that a certain blade has 1 mm of debris accumulated on the surface of the blade, the controller will consider the 1 mm debris accumulation as a boundary condition for later determinations of the debris accumulation.

As discussed above, the model parameters 114 provided to the controller 44 may describe the blade, the environment surrounding the blade, and/or expected rate(s) of wear on the blade. For example, the model parameters 114 may include a geometry of the blade, an expected operating temperature of the turbine section in which the blade is located, and/or an expected operating pressure of the turbine section in which the blade is located. Moreover, the model parameters 114 may include expected rates of wear such as an expected rate of spallation of a thermal barrier coating on the blade at the expected operating temperature and/or operating pressure, an expected rate of debris buildup on the blade, an expected rate of blockage of cooling holes within the blade (e.g., based on the expected rate of debris buildup), a rate of spallation of an environmental barrier coating of the blade or other component, a rate of debris buildup on the blade, a rate of oxidation of the blade or other component, a rate of corrosion of the blade or other component, among other suitable parameters, or a combination thereof. One or more of the parameters may be determined based at least in part on the value of another parameter. For example, the expected rate of blockage of cooling holes may be based at least in part on the expected rate of debris buildup. The expected rates of wear may be linear, quadratic, logarithmic, or another representation of the expected wear to the components of the gas turbine system. Default expected rates of wear may be provided to the controller 44 for initializing the individual models 104.

Further, the model parameters 114 provided to the controller 44 may include a threshold status of the blade that corresponds to a service limit of one or more states of the blade. That is, the threshold status may correspond to the service limit, such that the controller employs the threshold status to determine whether to output a signal indicative of a recommendation to repair or replace the blade, repair or replace the turbine, stop the rotary machine, or a combination thereof. The controller may then compare the current blade status to the predicted blade status, update the predicted blade status to match the current blade status, and update parameters of the individual model 104 based on the comparison, as discussed below.

Based on the inputs 100 and the individual models 104, the controller 44 determines the outputs 102. For example, the controller 44 determines a current status 120 for each blade based at least in part on the visual and IR image(s) from the one or more cameras. Additionally, the controller 44 determines predicted status 122 for each blade based at least in part on an operational time of the turbine and the individual model of the blade. The current status 120 includes current states of an amount of spallation of a thermal barrier coating of the blade, a number of blocked cooling holes within the blade, an amount of debris on the blade, a structural integrity of the blade, a status of a crack within the blade, or a combination thereof. Additionally, the predicted status 122 includes predicted states of an amount of spallation of a thermal barrier coating of the blade, a number of blocked cooling holes within the blade, an amount of oxidation of the blade, an amount of corrosion of the blade, an amount of debris on the blade, a structural integrity of the blade, a status of a crack within the blade, or a combination thereof.

The current status 120 and the predicted status 122 may each be the status percent of the state having the highest status percent relative to the respective service limits. For example, the current status 122 may indicate that the amount of spallation of the thermal barrier coating is 30% to a service limit for spallation, the number of blocked cooling holes is 40% of a service limit for blocked cooling holes, and the amount of debris on the blade is 50% of a service limit for debris. Thus, the current status 120 may be considered to have a status percentage of 50%, because the amount of debris has the highest status percent of 50%. Monitoring of the state of the current status 120 that is closest to its service limit allows the controller to determine when service of the blade is most likely to be recommended. For example, the controller 33 may control the gas turbine system and perform control actions based on the blade having the current status 120 and/or predicted status closest to its respective service limit.

The controller 44 may provide a signal indicative of the current status 120 and/or the predicted status 122 may be provided to a display 123 to inform an operator of the current status 120 and/or the predicted status 122 of each blade. The controller 44 may compare the current status 120 and/or the predicted status 122 of each blade to respective service limits (e.g., provided as model parameters 114). That is, the controller 44 may compare each state of the current status and each state of the predicted status 122 to respective service limits for each state. If the current status 120, the predicted status 122, and/or any states of the current status 120 or the predicted status 122 exceed the service limit, the controller 44 may perform a control action. In some embodiments, the control action includes outputting a signal to the display 123 indicative of an alert. The alert may be indicative of a recommendation to repair or replace the blade, a recommendation to repair or replace the turbine, a recommendation to stop the rotary machine, or a combination thereof.

In some embodiments, if the amount of debris on the blade has the greatest status percentage relative to the service limit for the amount of debris, the alert may also be indicative of recommending performance of a cleaning operation on the blade or turbine. After a cleaning operation is performed, the controller 44 may again determine the state indicative of the amount of debris on the blade. That is, visual and IR image(s) related to the amount of debris on the blade may be provided as a boundary condition to the individual model of the blade such that the status percentage is readjusted accordingly.

Further, the controller 44 compares the current status 120 to the predicted status 122 for each blade. Based at least in part on the comparison, the controller 44 updates the individual model 104 for each blade with updated model parameters 124. The updated model parameters 124 replace the model parameters 114. The updated model parameters 124 may align the individual models 104 to account for differences between the current statuses 120 and the predicted statuses 122 of the blades.

For example, if the controller 44 predicts that a blade will have a crack that is 1 mm long, and then receives visual and IR image(s) indicating the crack is 2 mm long, the model parameters 114 are updated to the updated model parameters 124. That is, the model parameters 114 are replaced with the updated model parameters 124 until the predicted status 122 of the blade (e.g. predicted length of the crack) matches the current status 120 of the blade (e.g., current length of the crack). That is, the predicted status 122 is redetermined based on the updated model parameters 124 until the current status 120 matches the predicted status 122 of the blade. Accordingly, the model parameters are updated until the predicted status 122 matches the current status 120. The match may be considered acceptable if the predicted statuses 122 and the current statuses 120 correspond to one another within a predefined threshold. In certain embodiments, the controller 44 employs the individual models 104 having the updated model parameters 124 to generate the service limit predictions of the blades (e.g., when will a state of the blade reach its respective service limit). In this manner, the controller 44 utilizes the visual and IR image(s) collected by the camera unit 42 to provide a more accurate current status 120 for comparison to the predicted status 122 compared to monitoring systems that do not use both visual and IR image(s).

In certain embodiments, the controller 44 is an electronic controller having electrical circuitry configured to process data from the camera unit 42. For example, the controller 44 may include one or more processors 130 and one or more memory components 132, such as one or more memory devices and one or more storage devices. The processor(s) 130 may be used to execute software, such as image processing software, and so forth. Moreover, the processor(s) 130 may include one or more microprocessors, such as one or more "general-purpose" microprocessors, one or more special-purpose microprocessors, and/or application specific integrated circuits (ASICS), or some combination thereof. For example, the processor(s) 130 may include one or more reduced instruction set (RISC) processors.

The storage device(s) of the memory components 132 (e.g., nonvolatile storage) may include read-only memory (ROM), flash memory, a hard drive, or any other suitable optical, magnetic, or solid-state storage medium, or a combination thereof. The storage device(s) may store data (e.g., image data, etc.), instructions (e.g., software or firmware for processing image(s), etc.), and any other suitable data. The memory device(s) of the memory components 132 may include a volatile memory, such as random access memory (RAM), and/or a nonvolatile memory, such as ROM. The memory device(s) may store a variety of information and may be used for various purposes. For example, the memory device(s) may store processor-executable instructions (e.g., firmware or software) for the processor(s) to execute, such as instructions for determining the predicted blade status, determining the current blade status, comparing the current blade status to the predicted blade status, updating the predicted status to match the current blade status, updating the parameters of the individual model, or a combination thereof.

In certain embodiments, the controller 44 may include a communication device 134 (e.g., network interface, wireless communication module, etc.) configured to communicate (e.g., via wired or wireless signals) with a remote server (or a cloud-based computer network (e.g., controller, remote controller), for example. In such embodiments, the controller 44 may output signals indicative of the visual and IR image(s) of the blade. In certain embodiments, the remote server or network (e.g., controller, remote controller) may store and/or process the signals from the camera unit 42 to facilitate short-term and/or long-term health monitoring of the turbine components. For example, the remote server or network may receive the signals from the camera unit 42 or the controller 44 to determine the current blade status. Via the individual model, the remote server or network may also determine the predicted blade status, compare the current blade status to the predicted blade status, update the predicted blade status to match the current blade status, update the parameters of the individual model based on the comparison, or a combination thereof. In some embodiments, the remote server or network is omitted and the controller 44 is located in a location remote from the camera unit 42.

Figure 4:
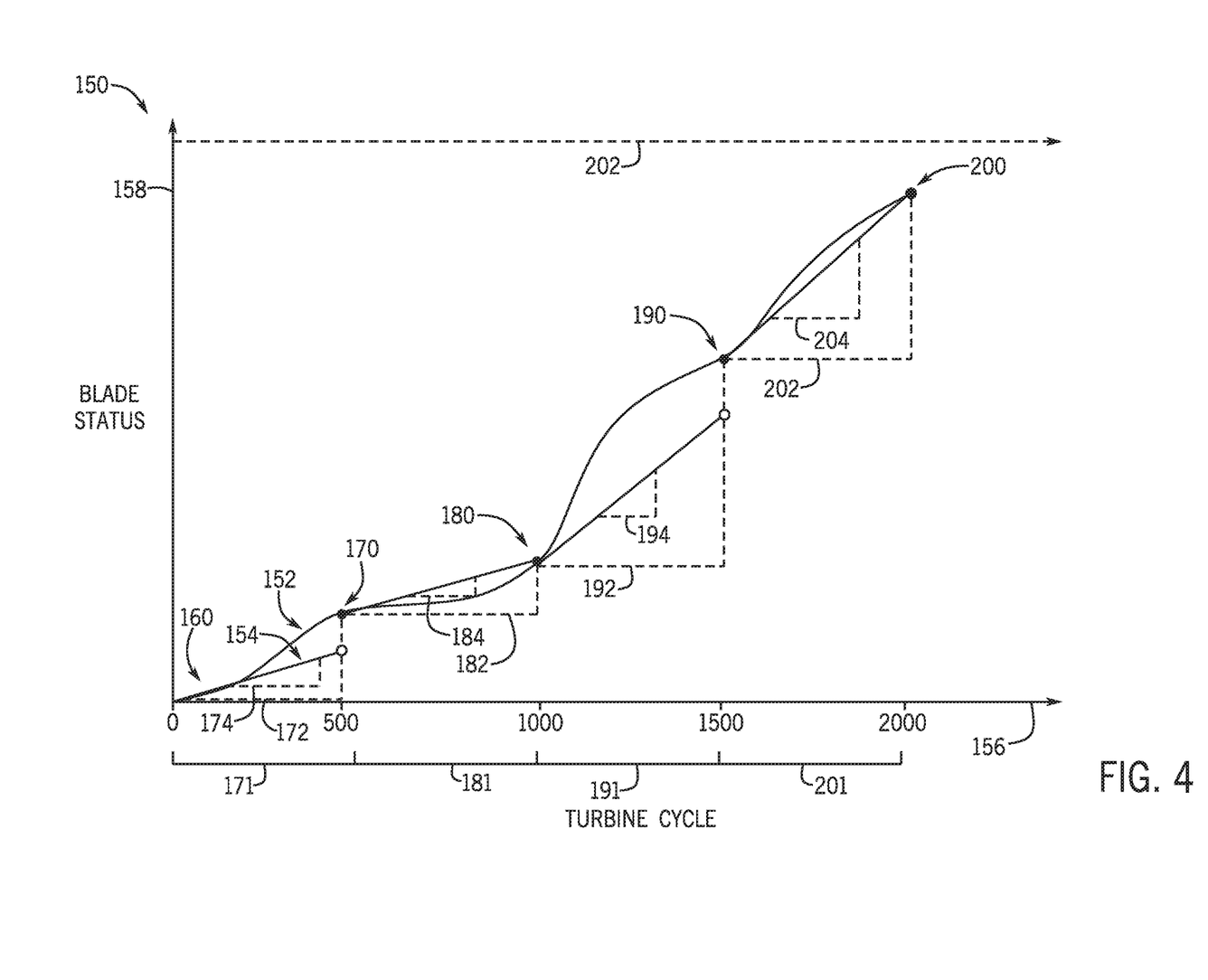
FIG. 4 is a graphical representation of an embodiment of statuses of a turbine blade of the gas turbine system of FIG. 1.

FIG. 4 is a graphical representation 150 of an embodiment of a current blade status 152 and a predicted blade status 154 of a turbine blade of the gas turbine system 10 of FIG. 1, as determined via an individual model of the blade. The current blade status 152 and the predicted blade status 154, shown for purposes of illustration, may account for the various states of the turbine blade discussed above. In some embodiments, the current blade status 152 and the predicted blade status 152 have the same status percentage as the state of the blade that is closest to its respective service limit. Reference numeral 156 (X-axis) is representative of turbine cycles. In some embodiments, turbine cycles are defined as a complete cycle of the turbine within the gas turbine system. For example, the turbine cycle may be defined as each instance that the turbine is energized and then shut off. As shown, the current blade status 152 and the predicted blade status 154 may be determined every 500 turbine cycles. In some embodiments, the quantity of turbine cycles 156 between status determinations may be greater or less than 500 turbine cycles. Additionally, reference numeral 158 (Y-axis) is representative of the blade status of each blade for both the current blade status 152 and the predicted blade status 154. As discussed herein, a higher blade status 158 is indicative of a blade status that is closer to a respective service limit (e.g., in terms of status percentage). Additionally, greater rates of wear and expected rates of wear correspond respectively to a greater slope of the current blade status 152 and the predicted blade status 154.

The blade statuses 152, 154 of the blade are shown for 2000 turbine cycles. In some embodiments, the current blade status 152 may be determined via visual and IR image(s) output by the camera unit 42. In some embodiments, the current blade status 152 may only be determined once every 500 turbine cycles. Using the individual model discussed above, the predicted blade status 154 may be determined by the controller for each turbine cycle 156. However, the predicted blade status 154 is only shown as being determined every 500 turbine cycles in FIG. 4. Based on the predicted blade status 154 and/or the current blade status 152 of the blade, the controller may transmit an alert indicating servicing of the blade is recommended. As an updated estimate of the blade status 158, the predicted blade status 154 may be employed by the optical monitoring system to more accurately predict when the blade is approaching the service limit. By relying on more accurate predicted blade statuses 152, the optical monitoring system more accurately determines when servicing and overhauls of the blade and the gas turbine system 10 should be performed.

In certain embodiments, the controller determines the predicted blade status 154 based at least in part on the individual model of the blade and the number of turbine cycles. To determine the predicted blade status 154, the optical monitoring system may perform an initial status determination 160 before a certain number of turbine cycles have occurred. The controller may receive signals indicative of the visual and IR image(s) of the blade, and then determine an initial current blade status. Then, the optical monitoring system may store the visual and IR image(s) or the initial current blade status determined from the visual and IR image(s) of the blade before the number of turbine cycles, such as 5, 10, 100 or more turbine cycles have occurred. The initial current blade status is supplied to the controller to improve the accuracy of a next predicted blade status determined via the individual model. Based on the initial status determination 160, the next determined predicted blade status may be more accurate than predicted blade statuses determined from a default initial current blade statuses.

After a quantity 171 of turbine cycles, such as 500 turbine cycles, has been completed, the optical monitoring system may perform a first status determination 170 to monitor the blades of the gas turbine system. During the first status determination 170, the visual and IR cameras output the signals indicative of the visual and IR image(s) of the blades to the controller. The controller identifies the individual blades within the visual and IR image(s) via identifying marks, codes, bar codes, engine serial numbers, or other features of the individual blade 54. Then, the controller compares the predicted blade status 154 determined by the controller based on the individual model to the current blade status 152 of the blade. For example, as shown, a status percentage for the highest state of the predicted blade status 154 has a lower status percentage than a status percentage for the highest state of the current blade status 152. As such, a first current rate of wear 172 (e.g., current rate of wear between the initial and first status determination) of the highest state of the blade was greater than a first predicted rate of wear 174 (e.g., predicted rate of wear between the initial and first status determination) used to determine the predicted blade status 154 at the first status determination 170. To improve the individual model, the controller then updates parameters of the individual model based on the comparison between the predicted blade status 154 and the current blade status 152 of the blade, such that the controller generates a predicted blade status 154 that matches the current blade status 152 (e.g., within a threshold status percentage).

For example, based on the comparison, the controller may determine that one or more parameters of the individual model should be updated. As one example, the controller may recognize that the turbine operated at a higher temperature than the estimated temperature of operation, thus causing the current rate of wear 172 to be greater than the first predicted rate of wear 174. Then, the controller updates the estimated temperature of operation and redetermines the predicted blade status 154 until the predicted blade status 154 matches the current blade status 152. In this manner, the predicted blade status 154 is compared to the current blade status and any identified discrepancies are reduced by updating the parameters of the individual model. Moreover, the controller inputs the current blade status 152 as a boundary condition to the individual model so that future predicted blade statuses 154 are determined from a known starting point.

At a second status determination 180 performed at a number 181 of turbine cycles 156 after the first status determination 170, the predicted blade status 154 is approximately equal to the current blade status 152 (e.g., within the threshold blade percentage). That is, status percentage for the highest state of the predicted blade status 154 is approximately equal to the status percentage for the highest state of the current blade status 152. In certain embodiments, the controller determines predicted visual and IR image(s) to compare to the current visual and IR image(s). Then, when the predicted blade status 154 and the current blade status 152 are approximately equal, the visual and IR image(s) received from the camera unit substantially corresponded to the predicted visual and IR image(s). Accordingly, a second current rate of wear 182 (e.g., current rate of wear between the first and second status determination) is substantially equal to a second predicted rate of wear 184 (e.g., predicted rate of wear between the first and second status determination). The parameters and inputs (e.g., previously received current blade status, previously received visual and IR image(s)) provided to the individual model based on the first status determination 170 established accurate prediction of the blade status at the second status determination 180. The controller may provide the current blade status 152 determined at the second status determination 180 to the individual model as a boundary condition. Further, any other sensor data or historic data is provided as input to the individual model, so later predicted blade statuses 154 are projected from the most information available.

During a third status determination 190 at a number 191 of turbine cycles after the second status determination 180, the camera unit outputs signals to the controller indicative of visual and IR image(s). The controller again determines the current blade status 152 of the blade based at least in part on the signals. Further, the current blade status 152 is compared to the predicted blade status 154. Upon comparison, the controller determines that the status percentage for the highest state of the predicted blade status 154 is not within a threshold range of the status percentage for the highest state of the current blade status 152. In some embodiments, the threshold range may correspond to a percentage difference between the status percentage of the predicted blade status 154 and the status percentage of the current blade status 152, such as 5 percent different, 10 percent different, 25 percent different, or the like. The parameters of the individual model are updated until the predicted blade status 154 determined by the controller is within a threshold range of the current blade status 152 determined during the third status determination 190. In some embodiments, the current blade status 152 and the predicted blade status 154 are considered equal only when each state of the current blade status 152 matches each state of the predicted blade status 154. Accordingly, a third predicted rate of wear 194 (e.g., predicted rate of wear between the second and third determination) is modified until the predicted rate of wear 194 is within the threshold distance from a third current rate of wear 192 (e.g., current rate of wear between the second and third determination).

Further, during a fourth status determination 200 taken a quantity of turbine cycles 156 after the third status determination 190, the status percentage for the highest state of the predicted blade status 154 is within a threshold difference from the status percentage for the highest state of the current blade status 152. Accordingly, the individual model estimated a fourth predicted rate of wear 204 (e.g., predicted rate of wear between the third and fourth determination) within a threshold distance from a fourth current rate of wear 202 (e.g., current rate of wear between the third and fourth determination).

The graphical representation 150 of the blade status 158 of a turbine blade of also includes a service limit 202, which corresponds to a blade status indicative of recommendation to repair or replace the blade, a recommendation to repair or replace the turbine, a recommendation to stop the turbine, or a combination thereof. For example, if the predicted blade status 154 or the current blade status 152 is greater than the service limit 202 at a turbine cycle 156 at which the determination of the current blade status or the predicted blade status 154 is performed, the controller may perform a control action. For example, the controller may transmit a signal indicative of an alert. The alert is indicative of a recommendation to repair or replace the blade, a recommendation to repair or replace the turbine, a recommendation to stop the rotary machine, or any combination thereof.

Generating predicted blade statuses that accurately determine (e.g. predict) when the blade will reach the service limit allows for more efficient and economical operation of the gas turbine system. That is, the optical monitoring system employs both visual and IR image(s) to accurately predict the blade status in a gas turbine system to accurately recommend repair or replacement of blades or component, thus positively affecting the safety and efficiency of the gas turbine system. Further, while the example discussed herein included certain predicted blade statuses that were less than the current blade statuses, it is to be understood that in other embodiments, the relationship between the predicted blade status and the current blade status may take a different form. For example, the predicted blade status may instead have certain status percentages that are larger than the current blade statuses.

Figure 5:
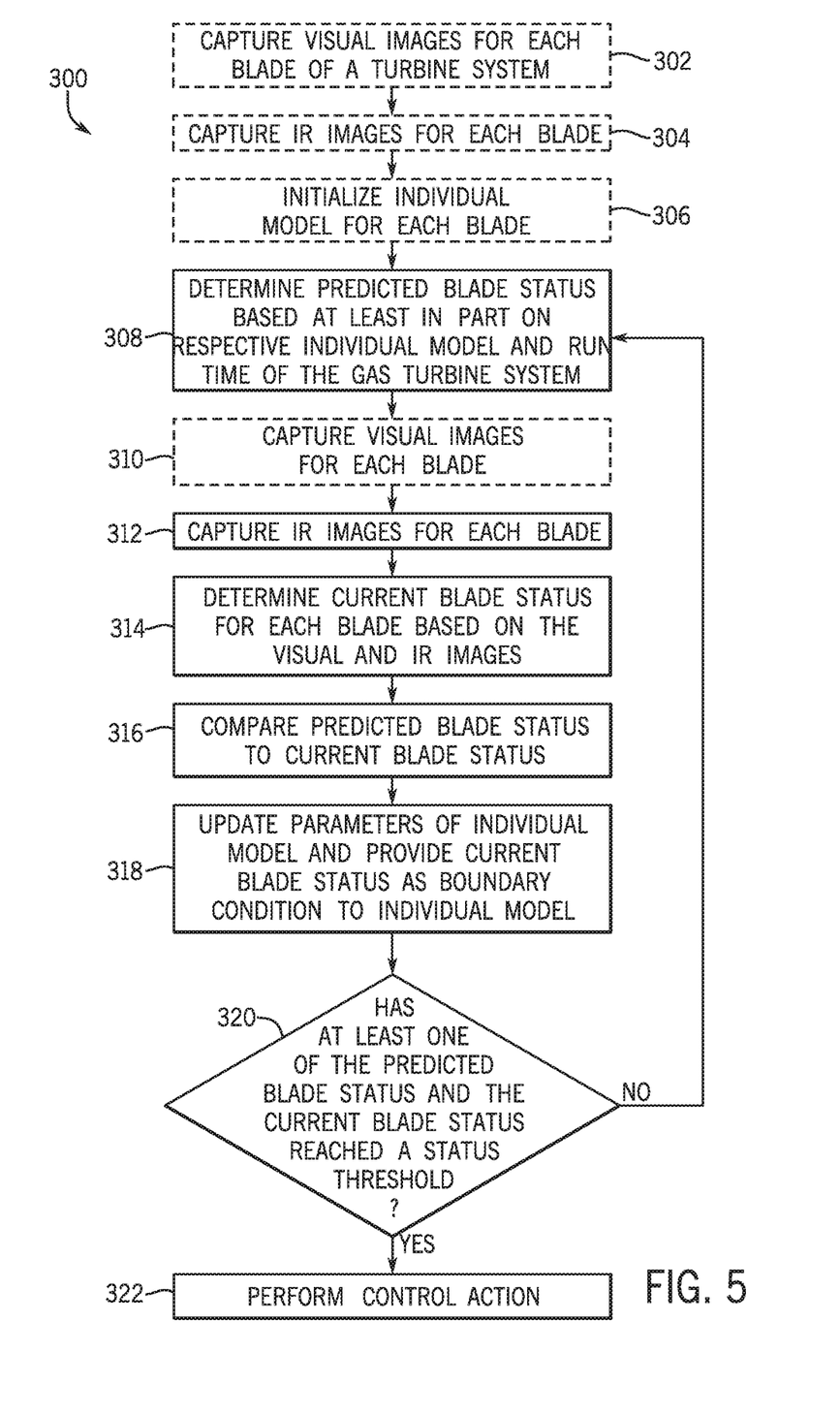
FIG. 5 is a flow diagram of an embodiment of a method for determining a predicted blade status and a current blade status of a turbine blade within the gas turbine system of FIG. 1.

FIG. 5 is a flow diagram of an embodiment of a method 300 for determining a predicted blade status and a current blade status of a turbine blade within the gas turbine system of FIG. 1. In certain embodiments, the method 300 is performed at least in part by the controller of the optical monitoring system. Although the method 300 is described with reference to multiple blades of the gas turbine system, it is to be understood that the method 300 may similarly be performed on a single blade of the gas turbine system or other components of the gas turbine system. As shown, the method 300 optionally begins with capturing (block 302) visual image(s) for each blade of the turbine system, which then may be stored in the memory component of the controller. The method 300 may additionally optionally include with capturing (block 304) visual image(s) for each blade of the turbine system, which then may also be stored in the memory component of the controller. As discussed above, the visual and IR image(s) may be collected as multiple image(s) from the camera unit of the optical monitoring system. The camera unit transmits the signals indicative of the visual and IR image(s) to the controller. The IR images may be collected only when the gas turbine engine has reached steady state, so that the blades are sufficiently heated to their respective operating temperature profiles. As discussed above, an initial status determination may be performed before the predetermined quantity of turbine cycles has occurred. The initial status determination provides the visual and IR image(s) and/or a current blade status determined from the visual and IR image(s) to the controller as boundary conditions for initialization of the individual model for each blade, thus providing a known blade status from which later predicted blade statuses are determined.

The method 300 optionally includes initializing (block 306) an individual model for each blade. In some embodiments, the individual model for each blade is initialized based on default boundary conditions, parameters, and/or predicted rates of wear. The default initialization may be specific to the type of turbine or the gas turbine system the blades are within, without providing specific information related to each individual blade. That is, the model may be initialized based on contextual information of the blades when the initial status determination is not performed. However, in some embodiments in which block 302 and/or block 304 were performed, the individual model for each blade is initialized based on the initial status determination performed when the gas turbine system is new, recently repaired, and/or recently cleaned.

The method 300 may further include determining (block 308) the predicted blade status for a blade based at least in part on its respective individual model and the run time or turbine cycles of the gas turbine engine. While the gas turbine system is undergoing normal operation, the controller may be remote from the gas turbine system, generating the predicted blade statuses based on the individual models. In certain embodiments, the individual models include parameters and boundary conditions. For example, the parameters may describe the geometry of the blades, the type of thermal barrier coating on the blades, the thickness of the thermal barrier coating, the position of the cooling holes in the blades, or other variables to describe the blades.

Further, the method 300 may optionally include capturing (block 310) visual image(s) for each blade. The method 300 includes capturing (block 312) IR image(s) for each blade. The visual and IR image(s) may be captured by the visual camera and the IR camera of the camera unit described above. The camera unit then transmits signals indicative of the visual and IR image(s) to the controller. Then, the method 300 includes determining (block 314) the current blade status of each blade based on the signals indicative of the visual and IR image(s). The current blade status is then compared (block 316) to the predicted blade status. Based on the comparison, the method 300 may include updating (block 318) the parameters of the individual model for each blade (e.g., each blade having a predicted blade status that differs from the current blade status by more than a threshold). For example, if it is determined that the predicted blade status is different than the current blade status by more than the threshold, the parameters or inputs of the individual model are updated (block 318) until the predicted blade status is within the threshold relative to the current blade status. In some embodiments, the predicted blade status is redetermined until the predicted blade status matches the current blade status.

Next, the method 300 includes deciding (node 320) if at least one of the predicted blade status and the current blade status has reached a threshold status corresponding to the service limit of the blade. If one of the predicted or current blade statuses is above the service limit, the method 300 may include performing (block 322) a control action. For example, the controller may transmit a signal indicative of an alert. The alert may be indicative of a recommendation to repair or replace the blade, a recommendation to repair or replace the turbine, a recommendation to stop the turbine, a recommendation to clean the turbine, or a combination thereof. Because the predicted blade status may be a prediction of the blade status at a later time, the controller may transmit a signal indicative of an alert if the later time is within a time threshold (e.g., within 500 turbine cycles, within 30 days). If both the predicted and the current blade statuses are below the service limit, the method 300 may cycle back to block 308 to continue determining the predicted blade status and current blade status of the blades of the gas turbine system.

It is to be understood that the method 300 described herein is merely exemplary, and that other decisions and blocks may be performed as necessary. For example, in some embodiments, when the controller determines that a blade may exceed the service limit, the gas turbine engine may be inspected via the optical monitoring system sooner than originally scheduled. Further, the parameters, boundary conditions, and/or predicted blade statuses of the individual model may not be updated based on the comparison between the current and the predicted blade statuses if either the current blade status or the predicted blade status at a certain time exceeds the service limit for one blade.

Moreover, although the present techniques have been described as monitoring current statuses and predicted statuses of a blade of the turbine, it is to be understood that in other embodiments, other components may be monitored by the optical monitoring system of the present disclosure. For example, the optical monitoring system may determine current statuses and predicted statuses of other components within a path of hot gas within a gas turbine system. For example, respective current statuses and predicted statuses may be determined shrouds, liners, angel wings, seals, shanks, or a combination thereof.

Technical effects of the disclosure include capturing IR image(s) and optionally capturing visual image(s) to establish more accurate predicted blade status of the gas turbine system. The predicted blade statuses are employed by the controller to determine service intervals of the gas turbine system 10 based on an expected time before the blade reaches its service limit. Based on the individual models provided for each blade 54 of the gas turbine system 10 and an operational time of the gas turbine system 10, the controller generates the predicted blade statuses of respective blades, and then the controller compares the predicted blade statuses to the current blade statuses. Based on the comparison, the parameters and boundary conditions of the individual model are updated (e.g., when the predicted blade status and the current blade status do not match within a threshold). Accordingly, the techniques disclosed herein increase the accuracy of the service limit determinations of the blades and the gas turbine system 10.

This written description uses examples to disclose the present subject matter, including the best mode, and also to enable any person skilled in the art to practice the subject matter, including making and using any devices or systems and perform any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An optical monitoring system comprising a controller configured to:
   determine a predicted status of a component within an interior of a rotary machine based at least in part on an operational time of the rotary machine and an individual model of the component;
   receive a first signal indicative of an infrared spectrum image of the component from one or more cameras;
   determine a current status of the component based at least in part on the first signal;
   compare the current status to the predicted status of the component; and
   update the predicted status of the component such that the predicted status matches the current status of the component and update at least one parameter of the individual model of the component based at least in part on the comparison.

2. The optical monitoring system of claim 1, wherein the predicted status of the component comprises a predicted amount of spallation of a thermal barrier coating of the component, a predicted amount of spallation of an environmental barrier coating of the component, a predicted number of blocked cooling holes of the component, a predicted amount of oxidation of the component, a predicted amount of corrosion of the component, a predicted amount of buildup of debris on the component, or a combination thereof; and
   wherein the current status of the component comprises a current amount of spallation of the thermal barrier coating of the component, a current amount of spallation of an environmental barrier coating of the component, a current number of blocked cooling holes of the component, a current amount of oxidation of the component, a current amount of corrosion of the component, a current amount of buildup of debris on the component, or a combination thereof.

3. The optical monitoring system of claim 1, wherein the controller is configured to identify the component from a plurality of components based on an engine serial number, markers disposed on the component, a comparison of the current status of the component to the predicted status of the component, or a combination thereof.

4. The optical monitoring system of claim 1, wherein the controller is configured to receive a second signal indicative of a visual spectrum image of the component from one or more cameras, wherein the controller is configured to determine the current status of the component based at least in part on the second signal, and wherein the controller is configured to determine a service limit of the component based at least in part on the predicted status of the component, the current status of the component, or a combination thereof.

5. The optical monitoring system of claim 4, wherein the controller is configured to generate the at least one parameter of the individual model based on the first signal and the second signal received from the one or more cameras during an initial status determination of the component performed before the rotary machine completes a predetermined quantity of cycles.

6. The optical monitoring system of claim 1, wherein the controller is configured to perform a control action in response to the current status of the component reaching or exceeding a threshold status corresponding to a service limit of the component, the predicted status of the component reaching or exceeding the threshold status at the time of the predicted status, or a combination thereof.

7. The optical monitoring system of claim 6, wherein the control action comprises outputting a signal indicative of an alert, wherein the alert is indicative of a recommendation to repair or replace the component, a recommendation to repair or replace the rotary machine, a recommendation to stop the rotary machine, a recommendation to clean the rotary machine, or a combination thereof.

8. The optical monitoring system of claim 1, wherein the at least one parameter of the individual model of the component comprises an operating temperature of the rotary machine, an operating pressure of the rotary machine, a rate of spallation of a thermal barrier coating of the component, a rate of spallation of an environmental barrier coating of the component, a rate of debris buildup on the component, a rate of oxidation of the component, a rate of corrosion of the component, a rate of blockage of cooling holes of the component, or a combination thereof.

9. The optical monitoring system of claim 1, wherein the controller is configured to determine the current status of the component, compare the current status to the predicted status, and update the predicted status and the at least one parameter of the individual model after the rotary machine has been operating for a threshold operating time.

10. The optical monitoring system of claim 1, wherein the controller is configured to determine the predicted status of the component based at least in part on historic data from a memory component, wherein the historic data comprises data stored during operation of the rotary machine.

11. The optical monitoring system of claim 10, wherein the historic data comprises flight information, full authority digital engine control information related to the rotary machine, or a combination thereof.

12. The optical monitoring system of claim 1, wherein the controller is located in a physical location remote to the rotary machine.

13. An optical monitoring system configured to optically communicate with an interior of a rotary machine, wherein the optical monitoring system comprises:
    one or more cameras configured to receive an infrared spectrum image of at least one component within the interior of the rotary machine, wherein the one or more cameras are configured to output a first signal indicative of the infrared spectrum image; and
    a controller communicatively coupled to the one or more cameras and configured to:
        determine a predicted status of the at least one component based at least in part on an operational time of the rotary machine and an individual model of the at least one component;
        receive the first signal output from the one or more cameras;
        determine a current status of the at least one component based at least in part on the first signal;
        compare the current status to the predicted status of the at least one component; and
        update the predicted status of the at least one component such that the predicted status matches the current status of the at least one component and update at least one parameter of the individual model of the at least one component based at least in part on the comparison.

14. The optical monitoring system of claim 13, wherein the predicted status of the at least one component comprises a predicted amount of spallation of a thermal barrier coating of the at least one component, a predicted amount of spallation of an environmental barrier coating of the at least one component, a predicted number of blocked cooling holes of the at least one component, a predicted amount of oxidation of the at least one component, a predicted amount of corrosion of the at least one component, a predicted amount of buildup of debris on the at least one component, or a combination thereof; and
    wherein the current status of the at least one component comprises a current amount of spallation of the thermal barrier coating of the at least one component, a current amount of spallation of an environmental barrier coating of the at least one component, a current number of blocked cooling holes of the at least one component, a current amount of oxidation of the at least one component, a current amount of corrosion of the at least one component, a current amount of buildup of debris on the at least one component, or a combination thereof.

15. The optical monitoring system of claim 13, wherein the controller is configured to receive a second signal indicative of a visual spectrum image of the at least one component from one or more cameras, wherein the controller is configured to determine the current status of the at least one component based at least in part on the second signal, and wherein the controller is configured to determine a service limit of the at least one component based at least in part on the predicted status of the at least one component, the current status of the at least one component, or a combination thereof.

16. The optical monitoring system of claim 13, wherein the at least one component comprises a plurality of components, wherein the controller is configured to determine the predicted status of the plurality of components, determine the current status of the plurality of components, and perform a control action based on a first component of the plurality of components that comprises a predicted status, a current status, or any combination thereof closest to a corresponding service limit of the first component.

17. A method, comprising:
    determining, via a controller, a predicted status of a component within an interior of a rotary machine based at least in part on an operational time of the rotary machine and an individual model of the component;
    receiving, via the controller, a first signal indicative of infrared spectrum image of the component from one or more cameras;
    determining, via the controller, a current status of the component based at least in part on the first signal;
    comparing, via the controller, the current status to the predicted status of the component;
    updating, via the controller, the predicted status of the component such that the predicted status matches the current status of the component; and
    updating, via the controller, at least one parameter of the individual model of the component based at least in part on the comparison.

18. The method of claim 17, comprising:
    receiving, via the controller, a second signal indicative of a visual spectrum image of the component from the one or more cameras;
    determining, via the controller, the current status of the component based at least in part on the second signal; and
    determining, via the controller, a service limit of the component based at least in part on the predicted status of the component, the current status of the component, or a combination thereof.

19. The method of claim 17, comprising performing, via the controller, a control action if the current status of the component reaches or exceeds a threshold status corresponding to a service limit of the component, the predicted status of the component reaches or exceeds the threshold status at the time of the predicted status, or any combination thereof.

20. The method of claim 17, wherein the at least one parameter of the individual model of the component comprises an operating temperature of the rotary machine, an operating pressure of the rotary machine, a rate of spallation of a thermal barrier coating of the component, a rate of spallation of an environmental barrier coating of the component, a rate of debris buildup on the component, a rate of oxidation of the component, a rate of corrosion of the component, a rate of blockage of cooling holes of the component, or a combination thereof.

* * * * *